United States Patent [19]

Bertolasi

[11] 4,112,423
[45] Sep. 5, 1978

[54] DUAL-SCREEN DATA DISPLAY TERMINAL FOR DATA PROCESSING UNITS

[75] Inventor: Robert B. Bertolasi, Rockford, Ill.

[73] Assignee: Kelsey-Hayes Co., Romulus, Mich.

[21] Appl. No.: 722,727

[22] Filed: Sep. 13, 1976

[51] Int. Cl.$^2$ .................................................. G06F 3/14
[52] U.S. Cl. ................................ 340/324 AD; 358/87; 358/237
[58] Field of Search ............. 358/87, 237; 340/324 A, 340/324 AD

[56] References Cited

U.S. PATENT DOCUMENTS

| | | | |
|---|---|---|---|
| 3,166,636 | 1/1965 | Rutland et al. | 340/324 A |
| 3,611,348 | 10/1971 | Rogers | 340/324 AD |
| 3,614,766 | 10/1971 | Kievit | 340/324 AD |
| 3,643,252 | 2/1972 | Roberts, Jr. | 340/324 AD |
| 3,792,462 | 2/1974 | Casey et al. | 340/324 AD |
| 3,833,764 | 9/1974 | Taylor | 358/87 |
| 3,889,253 | 6/1975 | Ross | 340/324 AD |
| 4,001,807 | 1/1977 | Dallimonti | 340/324 A |

Primary Examiner—Marshall M. Curtis

[57] ABSTRACT

A data display terminal that is particularly adapted for displaying data output from a batch computer. The invention utilizes a pair of conventional cathode ray tubes which are positioned adjacent one another so that the available display area is double that of a conventional display terminal. The terminal is adapted to display a line of data in sequence across both display screens. In this manner, with conventional 80 characters per line video monitors, a full 160 characters per line capability is realized.

Further disclosed herein is circuitry for automatically positioning the display of data in relation to the "fold" that exists between the two screens. The terminal is adapted to shift the displayed data either left or right as directed by the viewer so that the fold appears in a convenient location. The balance of the available viewing area is automatically filled with blanks.

In addition to the conventional scrolling feature found on most data display terminals, a heading protect circuit is disclosed which prevents a designated heading from being scrolled off the top of the display screen as additional information is scrolled onto the bottom of the screen. Furthermore, the terminal is adapted to remember information scrolled off of the screen so that the information can be retrieved and displayed again at a later time. Finally, a separate message page is provided so that interactive batch communications such as error messages, will not overwrite the text being prepared by the terminal operator.

25 Claims, 7 Drawing Figures

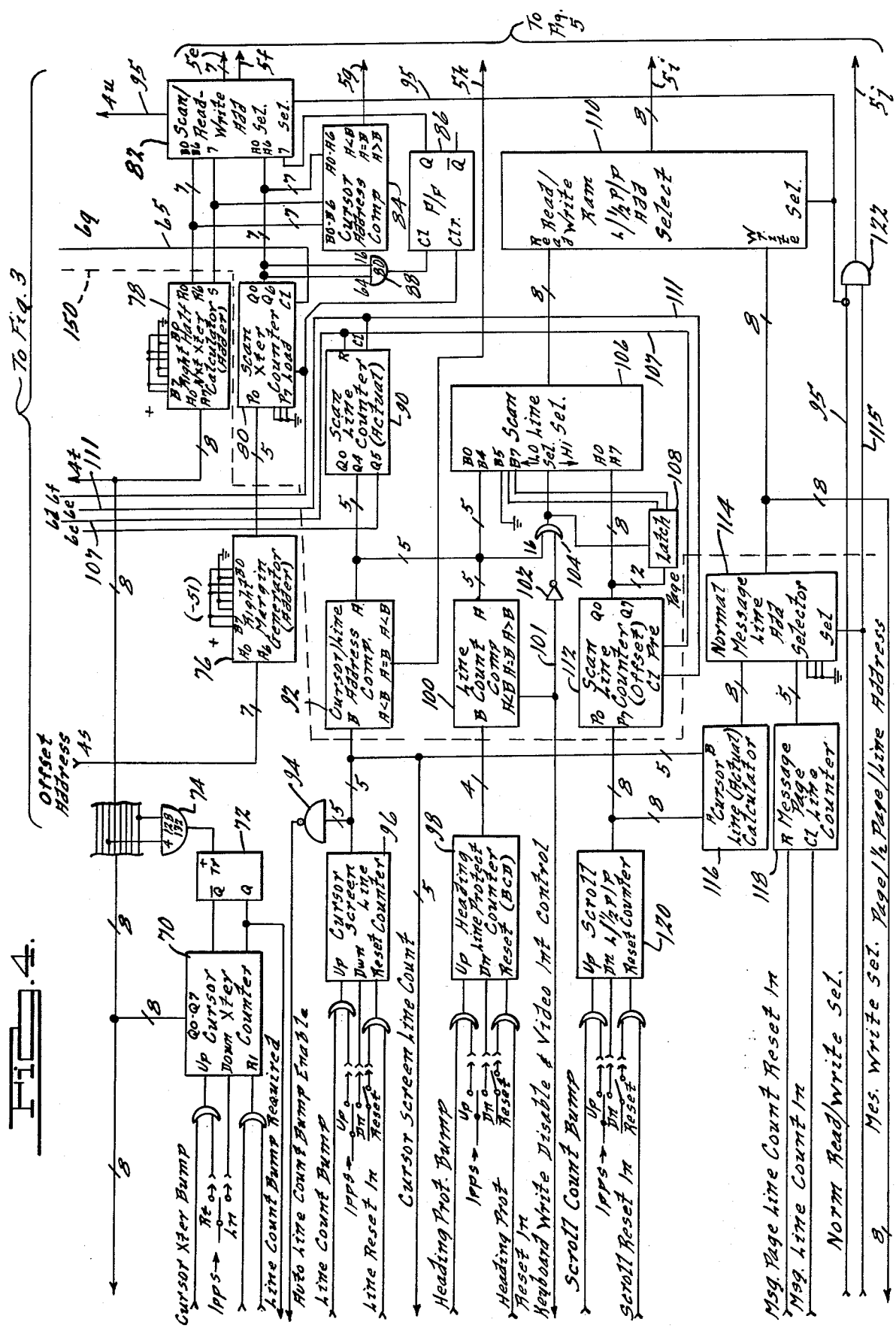

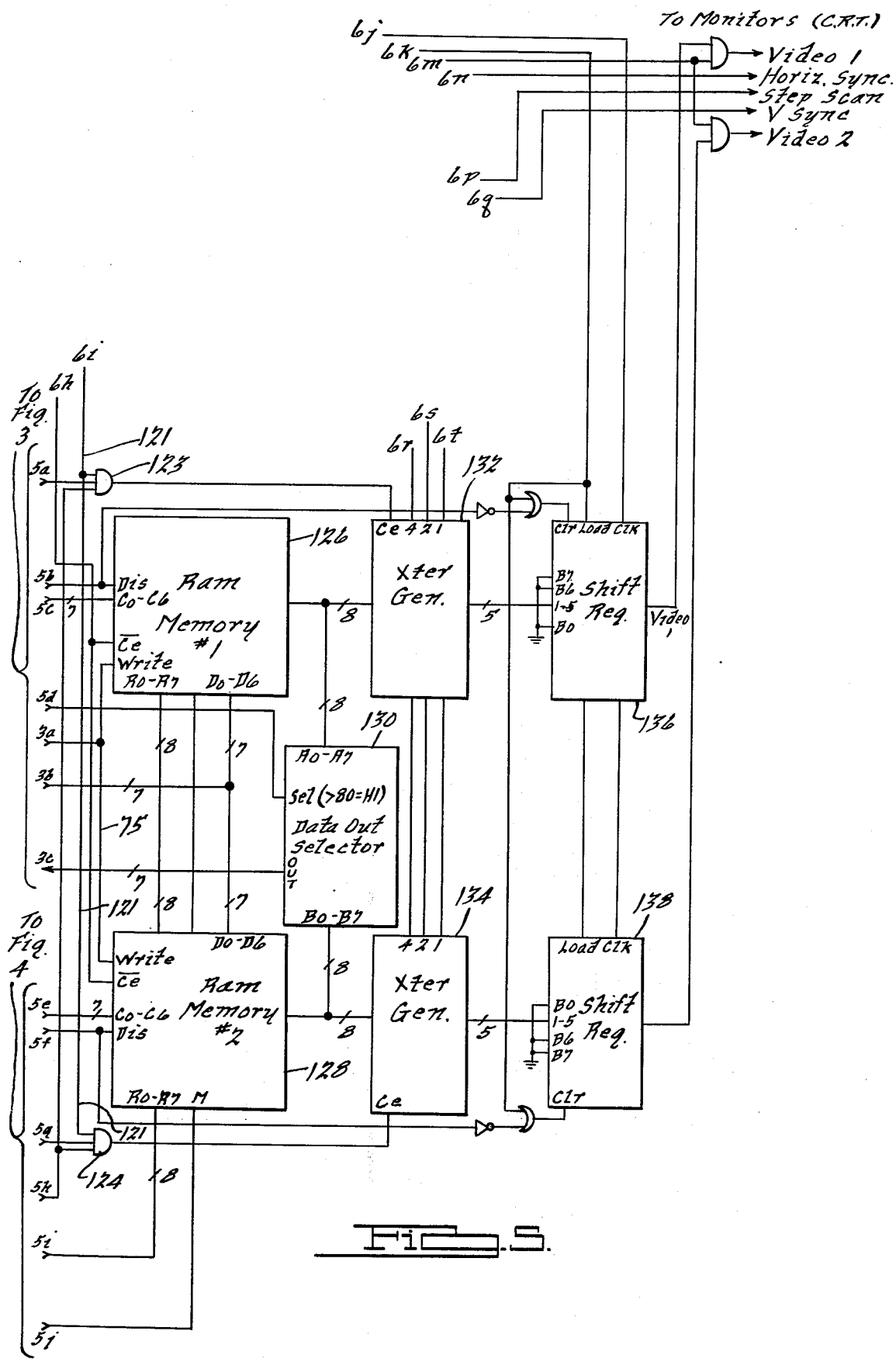

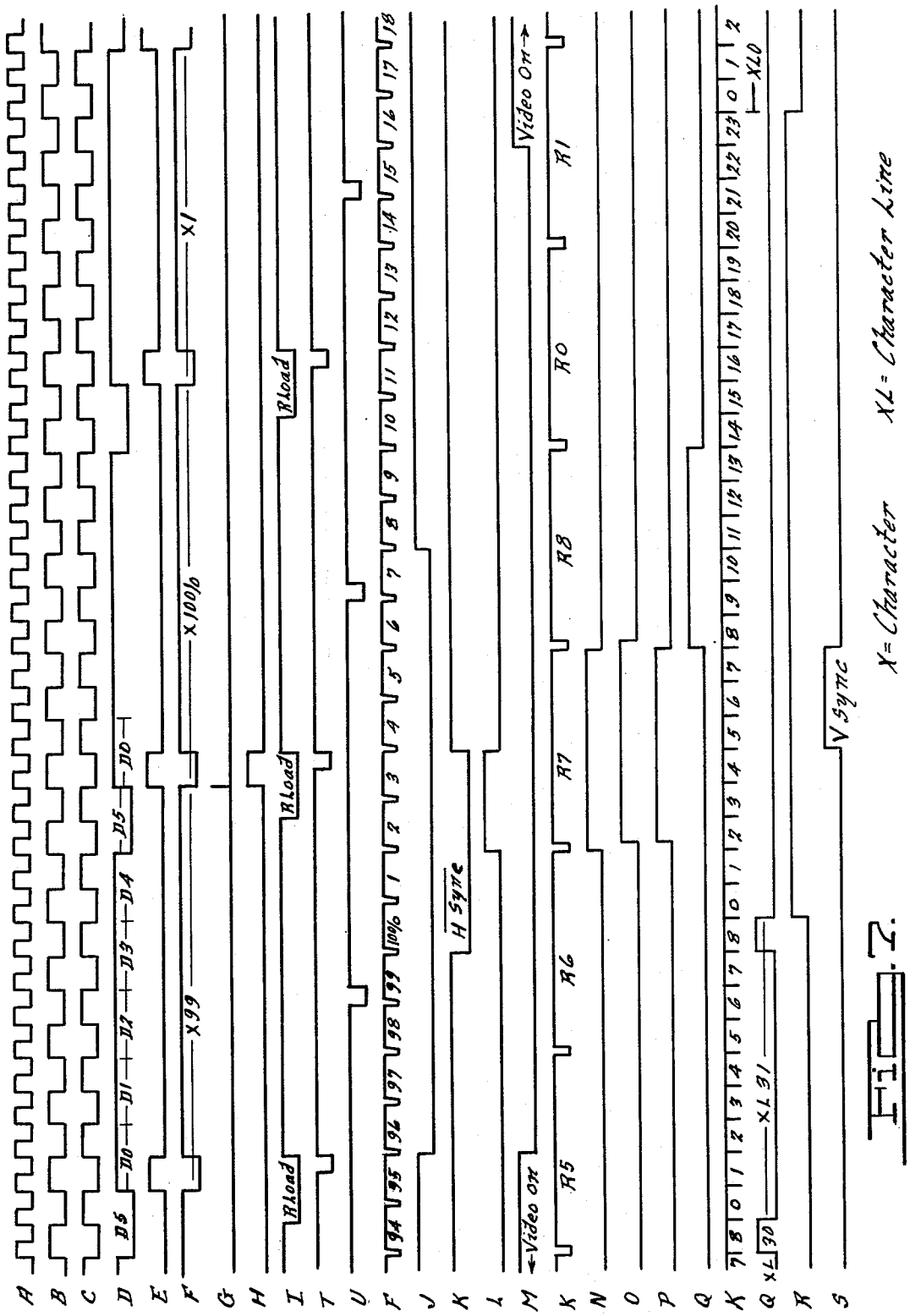

DUAL-SCREEN DATA DISPLAY TERMINAL FOR DATA PROCESSING UNITS

BACKGROUND AND SUMMARY OF THE PRESENT INVENTION

The present invention relates to a data display terminal that is particularly adapted for displaying in sequence across its display screen output data from a remote batch computer which typically contains 132 characters per line.

Conventional data display terminals are limited to a capacity of 80 characters per line. This is due to the limitations inherent in a conventional cathode ray tube. In particular, the screen of a cathode ray tube contains a fixed number of phosphorous dots, and it requires a certain number of dots to provide the necessary resolution to generate a single character. In addition, proper spacing must be provided between each character to make the information readable. Accordingly, the 80 characters per line limitation results.

Due to the limitations on the rastering rate of a cathode ray tube, merely increasing the size of the screen will not increase the effective number of characters which can be displayed per line. Although there has recently been developed high resolution cathode ray tubes which are capable of displaying a full 132 character line, these video monitors are very costly and impose special limitations on the circuitry required for their operation. Consequently, such display monitors have not received a high degree of commercial acceptance.

Thus, it is the primary objective of the present invention to provide a data display terminal using low cost video monitors that is capable of displaying computer print-outs containing 132 characters per line. To accomplish this, the present invention utilizes a pair of conventional cathode ray tubes positioned adjacent one another so that their display screens form a substantially continuous viewing area that is twice the width of a single display screen. The present terminal is adapted to display a line of data in sequence across both screens until the end of the line is reached. In this manner, a full 160 character line capability is attained.

However, output data configurations of computer printouts are typically not all the same. Consequently, in order not to have a column of data interrupted by the separation between the two screens, the present invention includes a "fold control" system that is adapted to effectively shift the block of data either left or right within the 160 character available viewing area. In particular, when displaying a computer print-out having a 132 character line format, the display area of the present terminal has an extra 28 character positions in each line. This column of excess display area allows the data displayed on the screen to be shifted a maximum of 28 character positions until the location of the gap in the viewing area relative to the position of the displayed data is such that the interruption in the viewing area does not seriously detract from its readability. Since the bulk of computer print-outs typically comprise columns of data, it becomes a convenient matter for the viewer to locate the "fold" between adjacent columns. In this manner, the displayed information appears much like the page of a book having two columns of printing.

As will subsequently be explained in greater detail, the operator of the terminal utilizes this feature once data is displayed on the screens simply by depressing a key on the terminal keyboard which shifts the data either left or right as selected one character position per second. When the desired data position is reached, the key is released and the offset position selected is set by the terminal. As additional data is read onto the display screens, the margins will automatically be established by the terminal in accordance with the offset position selected, and the vacant display area on either side of the data will be filled with blanks.

In order to achieve this feature, the effective character address of the data stored in the screen image memory of the terminal must be altered. As will be further described in greater detail, this is accomplished by off-setting the scan character counters for the two CRTs by presetting them to a value determined by the offset established by the terminal operator. In particular, the scan character counter for the left screen memory is preset to a value N counts below zero so that for the first N counts of the scan counter, the screen memory is disabled and only blanks appear on the display screen. After N counts, the scan counter reaches the "zero crossover" point, thereby enabling the screen memory. Thus, the characters stored in the memory begin to appear on the display screen. In a similar manner, the scan counter for the right screen memory is preset to a value N counts below its zero position. Since the "zero" position of the right screen memory corresponds to the 51st character position, the right scan counter is preset to a value of "51 + (28−N)". Accordingly, the first character to be shown on the right display screen is the character following the last character (79−N) displayed on the left display screen.

To permit the display data to be shifted either left or right across the two screens as described, the memory units for the two display screens must contain overlapping information. Specifically, as will also be described in greater detail, when the information from the computer is entered into the terminal memory, the column of information from the 51st character position to the 79th character position in each line is stored in the screen memory of each video monitor. This is to insure that the remaining characters in the 132 character line not displayed on the left screen will appear on the right screen. Accordingly, as will subsequently become more apparent, once the desired offset position is selected by the terminal operator, the fold control circuitry of the present invention automatically effects the display of the first character in the 132 character line on the left screen indented from the left margin by the number of character positions corresponding to the selected offset value, followed by as many succeeding characters as will fit on the first line of the remaining display area of the left display screen; and the display of the balance of the 132 characters not displayed on the left screen on the right screen with blanks comprising the remaining character positions in the first line of the right display screen. This process is repeated for each of the 32 lines of the display area. In this manner, information displayed on the terminal is read in sequence across both display screens irrespective of the positioning of the data within the total display area.

Additionally, the preferred embodiment of the present invention utilizes a pair of random access memory units for the screen image memory of the display terminal, instead of conventional shift registers, so that the effective memory capacity of the terminal is increased. In particular, the RAMs employed are preferably selected to be large enough to store up to four computer pages of information; a computer page being customarily defined as having having 132 characters per line and from 60–64 lines. In other words, the preferred memory capacity of the display terminal can accommodate eight times as much data as can be displayed on the display screens at any one time. In addition to providing the terminal operator with immediate access to a greater amount of information, the increased memory capacity also facilitates the transmission of multiple screens of information at a single time which improves the efficiency of batch communication.

The present invention also includes a novel heading protect circuit which isolates a designated number of lines at the top of the display screen from the balance of the display area which is subject to being shifted either up or down under the control of the scroll circuit. The heading protect circuit functions by overriding the line address during the read mode of operation for the designated number of lines after which the line address is automatically shifted to the location of the data desired to be displayed.

Finally, the present invention includes a unique message page feature which permits batch computer questions, corrections, or error messages to be stored separate from the working text area of the terminal memory. This permits the present terminal to receive and store communications from an external data processor without sacrificing part of the working text area of the terminal memory. Thus, for example, when a terminal operator commits an error, rather than overwriting the error message on the display screen and destroying the text being prepared, the present display terminal is adapted to signal the operator by flashing a light mounted on the keyboard console. At the same time, the error message from the batch computer is automatically entered into the separate "message page" area of the terminal memory. The operator then merely depresses the appropriate key on the keyboard to display the error message. When the key is released, the error message is removed and the text previously prepared by the operator can be retrieved intact. Thus, the appropriate corrective editing can easily be performed without having to rebuild the entire text or a substantial part thereof.

BRIEF DESCRIPTION OF THE DRAWINGS

Additional object and advantages of the present invention will become apparent from the following detailed description of the preferred embodiments which makes reference to the set of drawings in which:

FIG. 3 is a circuit diagram of another part of the data display terminal illustrated in FIG. 1;

FIG. 4 is a circuit diagram of another part of the data display terminal illustrated in FIG. 1;

FIG. 5 is a circuit diagram of another part of the data display terminal illustrated in FIG. 1;

FIG. 7 is a timing diagram associated with the timing circuit illustrated in FIG. 6.

DETAILED DESCRIPTION OF THE PREFERRED EMBODIMENT

Figure 1:
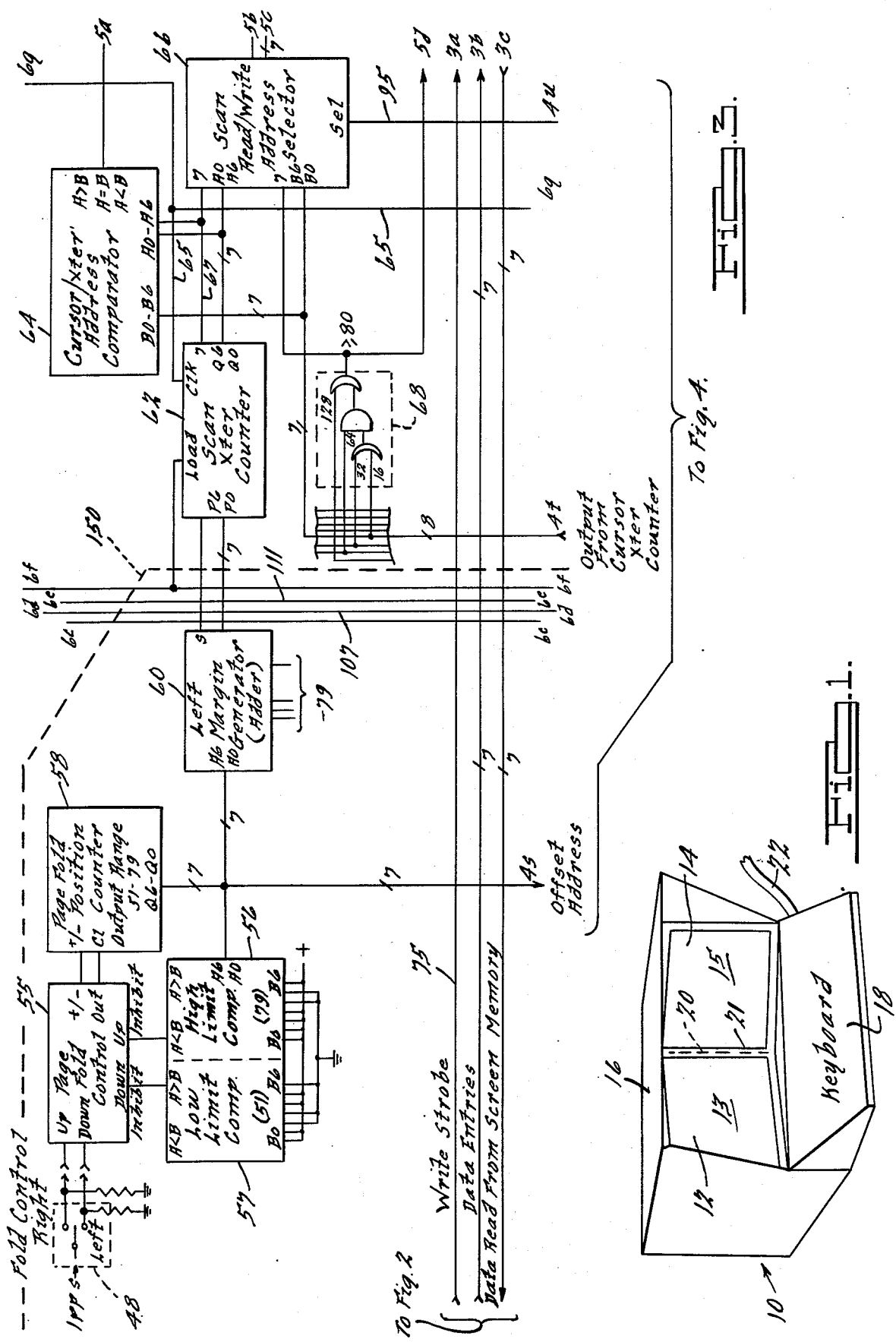
FIG. 1 is a perspective view of a data display terminal according to the present invention.

Referring to FIG. 1, a perspective view of a data display terminal 10 according to the present invention is shown. The display terminal 10 comprises a pair of video monitors 12 and 14 positioned adjacent one another inside a cabinet 16. Video monitors 12 and 14 comprise low cost conventional cathode ray tubes having a resolution capability of 80 characters per line and 32 lines per screen page. The CRTs 12 and 14 are preferrably positioned so that their respective screens 13 and 15 form an obtuse angle at their intersection 20 as shown, making the display area appear similar to the pages of an opened book. The gap 20 in the viewing area of the display screens is covered with a strip of molding 21 to improve its aethestic appearance. The display terminal 10 includes a keyboard 18 located on the front console of the unit. In addition to the conventional alphanumeric set of keys, the console includes several additional keys which are assigned special functions to be described herein.

The terminal 10 is particularly adapted to be tied into a remote batch computer (not shown) via an input/output line 22. Accordingly, a terminal operator can communicate with the remote computer by entering information via the keyboard 18, with the information entered therein being displayed on the display screens 13 and 15, and the computer can communicate with the keyboard operator by displaying on the video monitors information entered into the display terminal 10 via the input/output line 22.

Figure 2:
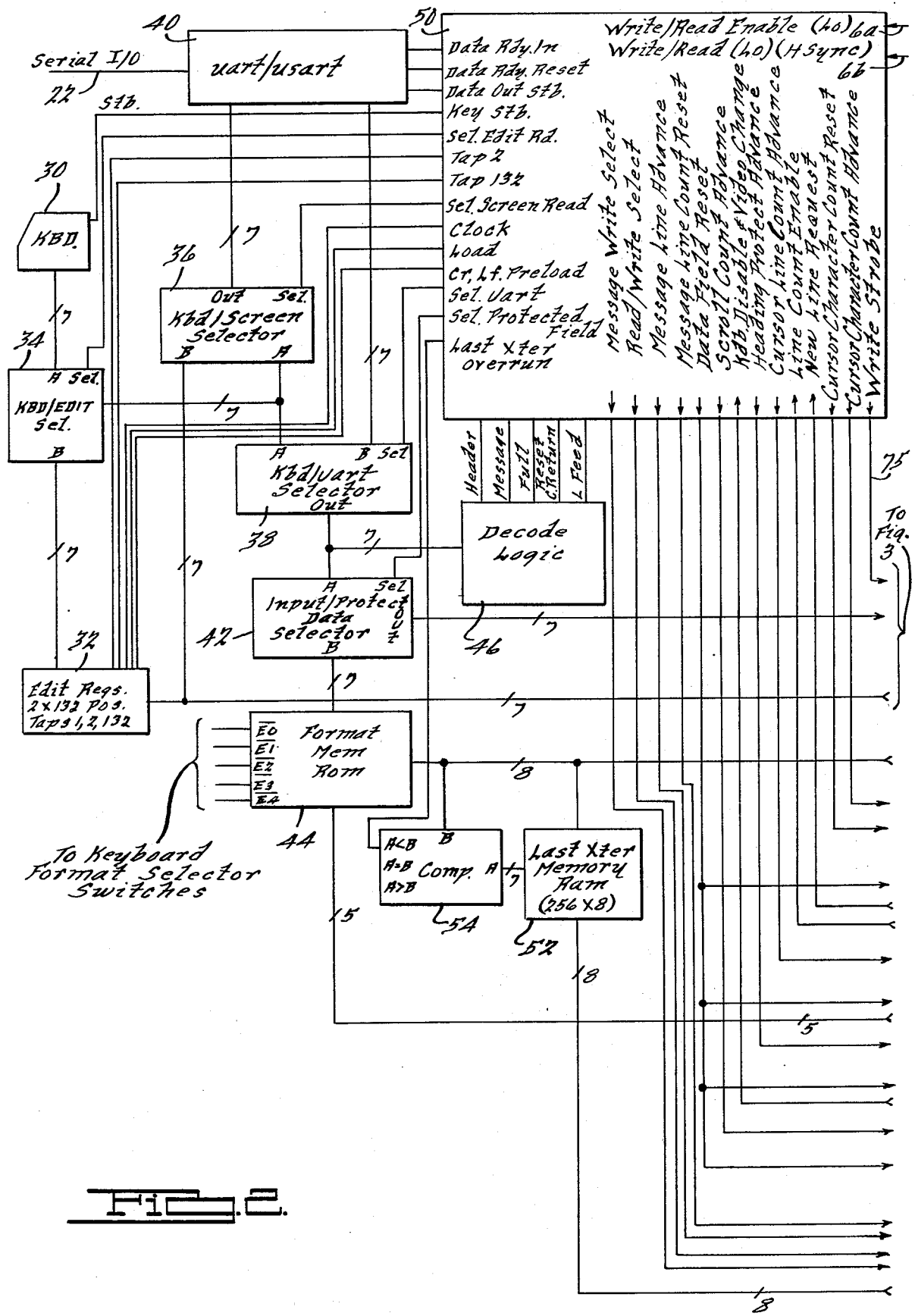
FIG. 2 is a circuit diagram of a part of the data display terminal illustrated in FIG. 1.

Referring now to FIG. 2, a combination schematic and block diagram of the input section of the data terminal 10 is shown. The input section includes a conventional keyboard circuit 30 associated with the keyboard 18 located on the front console of the terminal 10. The keyboard circuit 30 has seven parallel output lines for providing a unique signal combination for each of the 72 characters in, typically, the uniform ASCII code, as well as several unique characters included for purposes of the present invention. Information can only be entered via the keyboard 18 when the keyboard circuit 30 is enabled by a strobe signal from the read/write logic control circuit 50. The priorities of the terminal are established so that the keyboard 18 is subordinate to incoming data from a remote source via input/output line 22. Thus, whenever incoming data from a remote source is detected by the terminal, the keyboard strobe signal from the read/write logic control circuit 50 is automatically aborted, thereby disabling the keyboard 18.

The seven output lines from the keyboard circuit 30 are provided to one set of input terminals of a keyboard/edit selector 34. The other set of input terminals to selector 34 is connected to the output of an edit circuit 32 which receives data currently displayed on the display screens and performs conventional editing functions, such as character insert and delete and line insert and delete. Selector 34 is normally in the keyboard mode so that the parallel output signals from the keyboard circuit 30 are provided at the output of selector 34. However, when editing is performed, an edit select signal is provided by the logic control circuit 50 to selector 34 switching the state of the selector 34 so that the data from the edit circuit 32 is provided at the output of selector 34.

The output from selector 34 is provided to another pair of selectors, the keyboard/screen selector 36 and the KBD/UART selector 38. The keyboard/UART selector 38 determines whether the data to be provided to the screen image memory of the terminal originates from the keyboard 30 or from a remote communication source (UART). Selector 38 is adapted to normally be in the keyboard mode. However, when incoming data on I/O line 22 is received, the entering data has priority over the keyboard circuit 30. Accordingly, when incoming data is detected, a "UART select" signal from the read/write logic control circuit 50 is provided to selector 38 to switch the state of the selector 38 to conduct the signal information received from the remote source. The remote source to which I/O line 22 is tied could be for example a remote terminal such as a teletype, or any other data processing network including a batch computer.

The block labeled UART/USART to which I/O line 22 connects is essentially adapted to convert the incoming serialized data to a parallel output, and convert the outgoing parallel data read from the display terminal to serialized data, upon receipt of the appropriate enabling signals from the read/write logic control circuit 50. As previously stated, the control logic is designed so that whenever incoming data is received, the UART mode is given priority over the keyboard 18. However, for information being read from the display terminal and provided to a remote data processing network, the UART mode is subservient to the keyboard 18.

The keyboard/screen selector 36 is also normally in the keyboard mode so that information from the keyboard circuit 30 is provided to the UART converter circuit 40. However, when information is to be read directly from the terminal memory and provided to a remote processor, selector 38 is switched to conduct information received from the terminal memory upon receipt of a "select screen read" signal from the read/write logic control circuit 50.

The output from the KBD/UART selector 38, whether originating from the keyboard 18 or a remote source, is examined by the decode logic circuit 46 for certain predetermined instruction codes, such as carriage return and line feed, so that these signals are not memorized by the terminal memory as character information. In particular, decode logic circuit 46 is connected to the output from the KBD/UART selector 38 and is adapted to provide the appropriate command signals to the read/write logic control circuit 50 when any of the aforementioned predetermined instruction codes is detected. The logic control circuit 50 then generates the corresponding control signals which are provided to the appropriate circuits that implement the designated instructions.

Generally speaking, the read/write logic control circuit 50 comprises a plurality of logic gates and associated circuitry that is adapted to receive decoded commands and issue discrete signal instructions to the various circuits within the data terminal 10 and check to insure that the instructions have been complied with. In other words, the logic control circuit 50 is adapted to monitor the communicational interface (UART) 40, the keyboard circuit 30, the memory status, and format outputs as required in accordance with instructions from the terminal operator and the preestablished logic priorities. The various managerial lines of the control block 50 have been labeled for convenience.

The output from the KBD/UART selector 38 is also provided to the "A" set of input terminals of the input/protect data selector 42. The "B" set of inputs to selector 42 is connected to the output of a format memory ROM 44. As will subsequently be described in greater detail, the output data from selector 42 is presented to the data input terminals of the screen image memory units of the display terminal 10. The data presented is written into the terminal memory during the horizontal retrace time of the video monitors upon receipt of the appropriate enabling write strobe signal from the logic control circuit 50. Selector 42 is normally in the "active" data mode so that information received at its A input is provided to the memory units of the display terminal 10.

In accordance with instructions from the terminal operator, entered via the keyboard format selector keys, any number of character positions on the display screens can be preset to any desired character and then protected from being overwritten by subsequent data entry. This feature is utilized whenever it is desired to program into the display terminal a particular format to which subsequently entered data will conform. Similarly, it may be desirable simply to have the company title and address appear at the top of the display screens. To generate a protected format, the terminal operator selects the format mode via the format selector keys on the keyboard 18 and types in the desired characters at the appropriate locations on the display screens. The characters entered are then stored at the corresponding memory address locations within the format memory ROM 44. Thus, whenever a character position assigned to a character comprising part of the protected format is encountered during the display of data, the read/write logic control circuit 50 automatically generates a "field protect" signal which is supplied to the select terminal of selector 42, thereby switching the selector 42 to pass the character information stored at that address in the format memory ROM 44. In this manner, the programmed format is protected from being inadvertently written over by incoming active data occupying the same character positions on the display screens. Alternatively, with minor changes to logic control circuit 50, the display terminal 10 can be modified to initially load the screen image memory with the programmed format stored in the format memory ROM 44 so that the format is stored in the screen image memory prior to the presentation of the active data. Utilizing this alternative, whenever a character position conflict arises, the active data would be given priority to write over the format character previously entered into the screen image memory.

The last character memory RAM 52 and magnitude comparator 54 are utilized in a manner to be subsequently described in greater detail to facilitate the rapid transmission of information from the data display terminal 10 to a remote data processing network.

Figure 6:
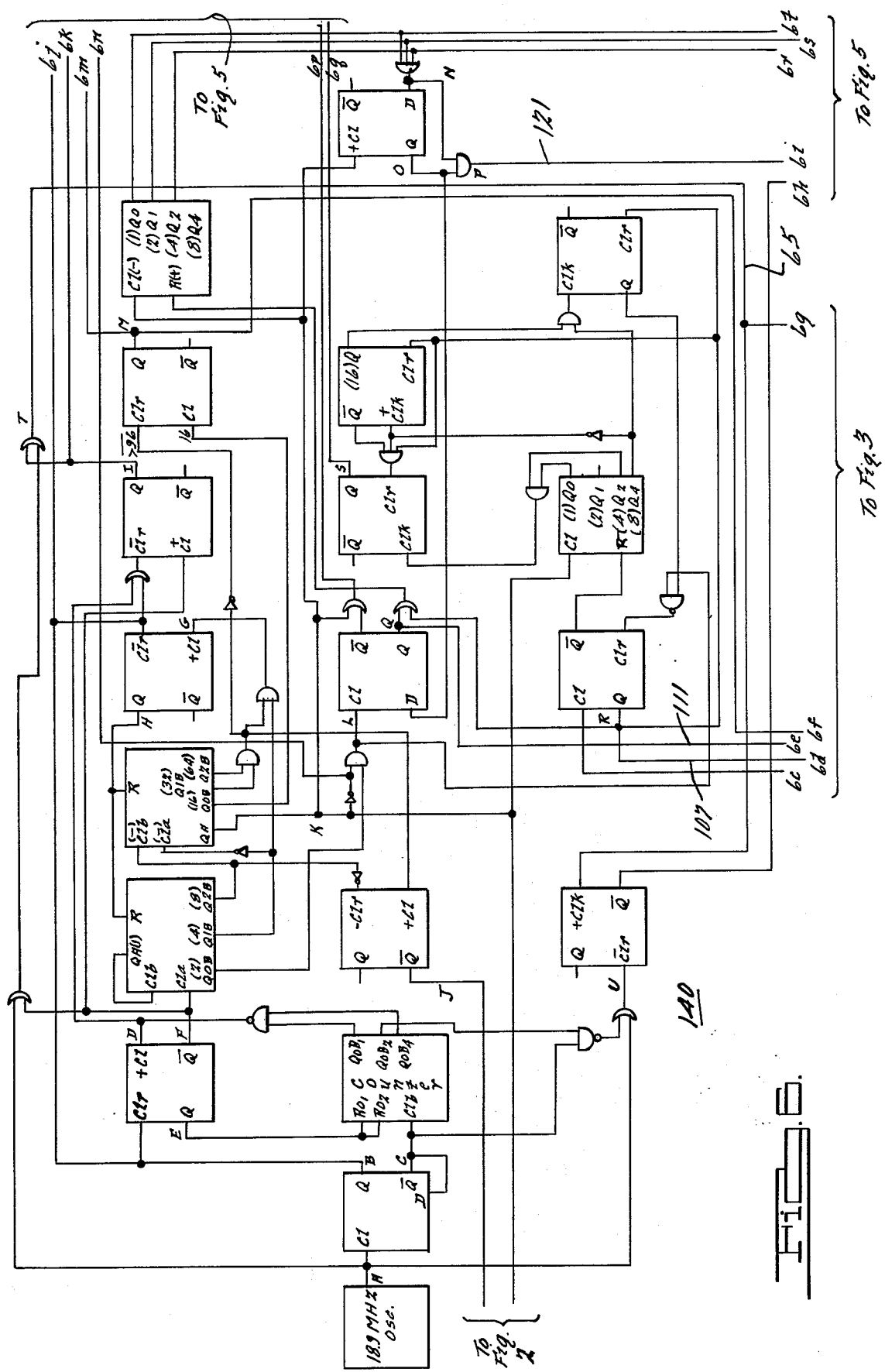
FIG. 6 is a circuit diagram of the timing circuit of the data display terminal illustrated in FIG. 1.

Turning now to FIGS. 3 through 5, the balance of the combined circuit and block diagram of the data display terminal 10, except for the timing circuit illustrated in FIG. 6, is shown. As previously stated, the present display terminal 10 is adapted to display a computer page of information without having to separate a complete line of data. A "computer page", as that term is used herein and understood by those skilled in the art, refers to a block of data having 132 character positions in each line and anywhere from 60 to 64 total lines. The screen image memory for the present data terminal 10 is provided by a pair of random access memory units (RAMs) 126 and 128. The combination of RAMs 126 and 128 provide the capacity to store four complete computer pages of information, or eight screens of data. In addition, RAM 128 has the capacity to store an additional screen of information which is utilized to implement the novel message page feature of the present invention to be subsequently described.

As previously stated, data entries are made into the RAM memories 126 and 128 during the horizontal retrace time of the video monitors via the data input terminals labeled D0 through D6 connected to the output of the input/protect data selector 42 shown in FIG. 2. Specifically, each character identified on the data entry lines D0 through D6 is entered into either or both of the RAM memories 126 and 128 upon receipt of a write strobe signal on line 75 from the read/write logic control circuit 50. The memory address location at which the character will be stored is determined by the character position number presented at the terminals C0 through C6 and the line and page number presented at terminals R0 through R7.

As stated in the Background and Summary of the Present Invention, in order to prevent the separation between the CRT screens from interrupting a page of data at an inappropriate location, it became necessary to include a "fold control" system that is adapted to effectively shift the block of data either left or right within the 160 character available display area until the separation between the screens is aligned with a convenient space in the displayed data, typically the space between columns of data. In order to achieve this feature, there must be an overlap in the data stored in the two RAM memories 126 and 128. In particular, the first 80 characters in each 132 character line, or character positions 0 through 79, must be stored in the left RAM memory 126, and the last 80 characters in each 132 character line, or characters 52 through 131, must be stored in the right RAM memory 128. In other words, characters 52 through 79 from each 132 character line are stored in both the right and left RAM memories, 126 and 128 respectively.

Data is entered, or "written", into the RAM memories 126 and 128 by utilizing the cursor position counters to access the RAM memories during the write mode. In other words, the cursor character address, as determined by the cursor character counter 70 and the cursor line counter 96, also establishes the write address for the RAM memories 126 and 128. As is well understood by those skilled in the art, "cursor" refers to the single character underscore which appears on the display screen ahead of the last character displayed thereon. For the keyboard operator entering data on the display screen, the cursor provides a convenient indication of the position on the display screen where the next character entered will be displayed.

The cursor character counter 70 is initially set to zero and automatically incremented after the entry of each character into RAM memories 126 and 128 by a signal received from the read/write logic control circuit 50. When the cursor character counter 70 counts to 132, the two inputs to AND gate 74 will both be HI causing the output therefrom to go HI. This, in turn, causes the Q output from flip-flop 72 to also go HI, thus resetting the cursor character counter 70. Additionally, the signal from the Q output of flip-flop 72 is provided to the read/write logic control circuit 50 to indicate the need for a line feed. The control circuit 50 will respond by automatically generating a line feed signal which is provided to the cursor screen line counter 96 to increment the counter.

The output from the cursor character counter 70 is provided to the write input terminals of address selector 66 and, through the right half character calculator 78, to the write input terminals of address selector 82. The outputs from address selectors 66 and 82 are connected to terminals C0–C6 of RAM memories 126 and 128 and determine the character position of the memory address accessed. The right half character calculator 78 is adapted to subtract 51 from the value of the cursor character counter 70, so that for the first 51 counts of the cursor counter 70 a negative binary number will be provided to the read-write address selector 82. Since a negative number in binary is indicated by setting the sign bit (i.e. the most significant bit) to a logical 1, it can be seen that for the first 51 counts of cursor counter 70, a HI signal will be provided to the disable terminal of RAM 128 when address selector 82 is in the write mode. Accordingly, with RAM 128 disabled, the first 51 characters in each 132 character line will not be stored in the right RAM memory 128. Rather, the first character entered into RAM memory 128 will correspond to the 52nd character in each 132 character line. After the 132 nd character is entered into RAM memory 128, the cursor character counter 70, having counted to 132, will automatically be reset to zero as previously explained, thereby setting the output of the right half character calculator 78 back to a minus 51 which in turn causes the sign bit to once again go HI to disable RAM memory 128.

As stated previously, the seven bit output from the cursor character counter 70 is also provided directly to the left memory scan read-write address selector 66. The 16th, 32nd, 64th, and 128th bit lines are additionally tied to a three-gate logic circuit 68 which is adapted to provide a HI output signal whenever the output from the cursor character counter 70 is greater than or equal to 80. The output from logic circuit 68 is provided as a sign bit to address selector 66, which in turn applies the signal to the disable terminal of RAM memory 126. Accordingly, when the cursor character counter 70 counts to eighty, the left RAM memory 126 is disabled and no further characters can be entered. Thus, only the first eighty characters, 0–79, in each line are stored in left RAM memory 126.

The line address of RAM memories 126 and 128 accessed during the write mode of operation is determined by the cursor screen line counter 96 and the actual cursor line calculator 116. The cursor screen line counter 96 is originally set to zero and is incremented either manually by the terminal operator upon requesting a line feed, or automatically upon the cursor character counter counting to 132, as indicated by a HI output signal from the Q output terminal of flip-flop 72. The cursor screen line counter 96 is adapted to count to 32 in accordance with the line position of the cursor on the display screens. The five output lines from line counter 96 are tied to the inputs of a NAND gate 94. Thus, when the cursor screen line counter 96 has counted to 32, the output from NAND gate 94 will go HI indicating the bottom of the screen has been reached.

The output from the cursor screen line counter 96 is provided to one set of inputs to the actual cursor line calculator 116. The need for the actual cursor line calculator 116 can be explained as follows. Although, for example, the data being entered by the terminal operator is displayed on the first line of the screens, the same data is probably being written into one or both of the RAM memories 126 and 128 at a memory line address other than zero. This is due to the fact that the CRTs can display only 32 lines of data, whereas RAM memories 126 and 128 can store up to 256 lines of data. However, since it is desirable to provide the terminal operator with a visual indication of the data currently being entered into the RAM memories 126 and 128, the scroll counter 120 is provided so that regardless of the particular section of the RAM memories 126 and 128 into which data is currently being entered, the logic control circuitry or the terminal operator can always adjust the scroll counter 120 so that an appropriate 32-line section of the RAM memories 126 and 128 is being read onto the display screens. The scroll counter 120 determines the actual memory line address of the line of data displayed at the top of the display screens.

Accordingly, for the terminal operator to have visual access to the RAM memory locations having line addresses greater than 32, it becomes necessary to add to the output of the cursor screen line counter 96 the offset line value established by the scroll counter 120. This is accomplished by connecting the output from the scroll counter 120 to the other set of inputs to the actual cursor line calculator 116. Calculator 116 is adapted to add the two values to determine the cursor line address relative to the 256 line capacity of RAM memories 126 and 128. The output from the actual cursor line calculator 116 is provided through the message line address selector 114, to be subsequently described, to the write address input terminals of the read/write RAM address selector 110. Thus, it can be seen that when address selector 110 is in the write mode of operation, the output from the actual cursor line calculator 116 determines the accessed memory line address of the RAM memories 126 and 128.

In order to properly display the data stored in RAM memories 126 and 128 so that the character succeeding the last character displayed on the left video monitor 12 is the first character displayed on the right video monitor 14, irrespective of the positioning of the block of data relative to the "fold" between the two screens, the effective display address of each character must be alterable. This is accomplished by generating an offset number which is used to preset the scan character counters 62 and 80 to a value typically other than zero.

The offset number is generated by the terminal operator by actuating the fold control key located on the console of the terminal 10 which increments the page fold position counter 58 either up or down as instructed. As the circuit diagram illustrates, the fold control key 48 is connected to a page fold count control 55 which controls the incrementing of the page fold position counter 58. The output from counter 58 is provided to high and low limit magnitude comparators, 56 and 57 respectively, which insure that the position counter 58 is not incremented beyond the limits of its established range. The limits within which the offset number can vary are determined by the display capacity of the CRTs and the number of characters per line in a computer page. Specifically, since each CRT can display a maximum of only 80 characters per line, the minimum number of characters that can be displayed on one screen and still have the capacity to display the balance of a 132 character line on the other screen, is 52. Accordingly, the limits of the offset number are 51 and 79, with zero corresponding to the first character position.

It should be recognized, however, that for margin notation capabilities or other character/line capabilities, all of the preset comparators herein can be readjusted as required; e.g. to provide 150 characters per line or to allow offset of incoming data memory addresses sufficient to drop end columns of data from memory, such as price or dealer price exclusions, etc.

The desired offset number selected by the terminal operator is provided to a left margin generator 60 and right margin generator 76. The left margin generator 60 subtracts the value 79 from the selected offset number, so that the output from the left margin generator 60 will vary anywhere between a negative 28 and zero. The right margin generator 76 is adapted to subtract 51 from the offset number selected, so that the output from the right margin generator 76 will vary between zero and a positive 28. The resultant values generated at the outputs of the left and right margin generators, 60 and 76 respectively, represent the character addresses to which the scan character counters 62 and 80 will preset.

Scan character counters 62 and 80 are each adapted to increment 80 counts from their preset addresses before being automatically reset by a line feed. Both counters 62 and 80 are incremented by a signal received at their clock terminals on line 65. The outputs from the left and right scan character counters 62 and 80 are provided to the read input terminals of the scan/read-write address selectors, 66 and 82 respectively. The outputs from address selectors 66 and 82, as previously explained, are provided to the left and right RAM memories 126 and 128 and control the displayed character position of the memory address accessed.

Looking to the left scan character counter 62, it will be noted that the left margin generator 60 adds a sign bit to the binary output provided to scan character counter 62. The sign bit from the output of the scan character counter 62 is provided through the address selector 66 to the disable terminal of RAM memory 126. Thus, when preset to a negative number by the left margin generator, the scan character counter 62 will generate a HI output signal on its most significant bit line, disabling RAM memory 126, until the counter 62 has counted to zero. Accordingly, for the first N character positions on the display screen corresponding to the preset address of the scan character counter 62, a blank will be generated. Once the scan character counter 62 has counted to zero, RAM memory 126 is no longer disabled and the character stored in the zero memory address location is read from memory and displayed on the screen at the Nth character position. The succeeding characters stored in RAM memory 126 are then displayed in the remaining character positions in the first line on the display screen until the 80th character position at the right hand edge of the screen is reached.

Thus, for example, if the offset number selected is 69 so that the scan character counter 62 is preset to a $-10$, the data displayed on the left hand screen will appear indented 10 character positions from the left hand margin and comprise 70 characters per line. When the end of the line is attained, the read/write logic control circuit 50 will automatically signal for a line feed and the scan character counter 62 will automatically be reset to its negative preset address value. Thus, the identical process will be repeated for each of the 32 lines on the display screen with each line being indented by the same offset number of character positions.

Now, in order for the data to be displayed in sequence across both the left and right hand display screens, the character displayed in the first character position on the right hand screen must correspond to the succeeding character in the 132 character line following the last character displayed on the left hand screen. In other words, if the 69th character is the last character displayed on the left hand screen, then the 70th character should be displayed in the first character position on the right hand screen. Since RAM memory 128 has characters 52 through 131 stored therein, the 70th character, for example, is located at memory address 18. Thus, for the 70th character to be displayed in the first character position on the right hand display screen, the scan character counter 80 must be preset to a value of 18. And in fact, using the example outlined above, with an offset number of 69, the preset address provided to scan character counter 80 after the right margin generator subtracts 51, is 18.

Thus, in the example postulated, the 70th through 132nd characters will be displayed on the right hand display screen. To insure that the remaining character positions on the screen are filled with blanks, the 16th and 64th bit lines from the output of scan character counter 80 are provided to an AND gate 88 which has its output thereof connected to the clock terminal of a flip-flop 86. To Q output terminal from flip-flop 86 is connected through address selector 82 to the disabled terminal of RAM memory 128. Accordingly, when scan character counter 80 reaches the 80th count, the Q output from flip-flop 86 goes HI, thereby disabling RAM memory 128. Thus, everything after the 131st character on the right hand display screen is blanked.

The line address of RAM memories 126 and 128 accessed during the read mode of operation is determined by the offset scan line counter 112. In particular, counter 112 determines which group of 32 lines out of the total 256 lines stored in RAM memories 126 and 128 is to be displayed on the display screens. Specifically, of the eight output lines provided from offset scan line counter 112, output lines Q0 through Q4 establish the line address, output line Q5 establishes the half page, and output lines Q6 and Q7 establish the computer page. Scan counter 112 is incremented by a clock signal received on line 111, and is adapted to count 32 times from its offset value. Upon attaining its 32nd count, the counter 112 is automatically reset to its offset value by a reset signal received on line 107 from the timing and synchronization circuit 140 (FIG. 6).

The output from the offset scan line counter 112 is provided through a selector 106, to be subsequently described, to the read address input lines of the read-/write RAM address selector 110. When address selector 110 is in the read mode, the line address determined by the output of the offset scan line counter 112 is provided to the line address input terminals of RAM memories 126 and 128. Accordingly, it can be seen, that during the read mode of operation, the value of the offset scan line counter and the condition of selector 106 determine the accessed line address of RAM memories 126 and 128.

As stated, the offset scan line counter 112 is adapted to address a selected group set of 32 lines from the 256 total lines of data stored in RAM memories 126 and 128. The group of 32 lines scanned by counter 112 is determined by the scroll counter 120 which establishes the offset value to which counter 112 is preset. In other words, the eight bit output from the scroll counter 120 provided to the offset scan line counter 112 determines the memory address of the line of data to be displayed at the top of the display screens. The value of scroll counter 120 can be adjusted by the terminal operator by activating the scroll count advance key located on the console of the terminal 10, which is effective to increment the scroll counter 120 one line per second. Thus, by bumping the scroll counter 120 either up or down, the terminal operator can read any desired set of 32 lines of data stored in the RAM memories 126 and 128. Accordingly, it can be seen that, depending on the setting of the scroll counter 120 as determined by the terminal operator, the scan line offset counter 112 will access a selected group of 32 lines to be read from RAM memories 126 and 128 and displayed on the screens.

Significantly, it will be noted at this point that, unlike many conventional data display terminals that utilize shift registers for the screen image memory, the present display terminal 10, by employing random access memory units, is able to retain information scrolled off of the display screen. In particular, since the setting of scroll counter 120 during the read mode of operation in no way affects the data stored in RAM memories 126 and 128, information scrolled off the display screen can be retrieved by the terminal operator simply by bumping the scroll counter 120 in the opposite direction. As will be appreciated by those skilled in the art, this feature can be a tremendous convenience when viewing computer print-outs having significantly more than 32 lines of data.

In general, it is to be understood that the scan counters described herein refer to the "moving" system which is continuously being cycled at the rastering rate of the CRTs. On the other hand, the cursor counters identify a particular location on the display screen which is incremented a position at a time as characters are written into the RAM memories 126 and 128. Since RAM memories 126 and 128 are accessed by the scan counters in the read mode of operation, it can be seen that, in order to display the cursor in the proper location on the display screen, it is necessary to compare the value of the scan counters with that of the cursor counters so that it can be determined when the values of the counters are equal. This function is performed by the cursor character address comparators 64 and 84, and the cursor line address comparator 92. Cursor character address comparator 64 is connected to receive at one of its inputs the output from the left screen scan character counter 62, and cursor character address comparator 84 is connected to receive at one of its inputs the output from the right screen scan character counter 80. The output from the cursor character counter 70 is connected to the other input of address comparator 64, and, via the right half character calculator 78, to the other input of address comparator 84. Both address comparators 64 and 84 are adapted to compare the magnitudes of the binary signals applied to their respective inputs and provide an output signal to an AND gate, 123 and 124 respectively, whenever the values of the two signals are equivalent.

Similarly, the cursor line address comparator 92 is connected to receive at one of its inputs the output from the cursor screen line counter 96, and at its other input the output from the actual scan line counter 90. As with the character address comparators 64 and 84, the cursor line address comparator 92 is adapted to compare the magnitude of the two binary signals applied to its inputs and provide an output signal to both AND gates 123 and 124 when the values of the two signals are equivalent.

Accordingly, it can be seen that when a signal is present from both the cursor character address comparator 64 and the cursor line address comparator 92, the trace of the left hand CRT 12 is currently at the proper cursor location. Similarly, when an output signal is provided by both the cursor character address comparator 84 and the cursor line address comparator 92, the trace of the right hand CRT 14 is currently at the proper cursor location.

In addition, it will be noted that a third signal is provided to AND gates 123 and 124 on signal line 121 from the timing and synchronization circuit 140 illustrated in FIG. 6. This signal line 121 is provided to insure that the cursor is displayed only on the bottom scan line of the character line. Specifically, it is to be understood that each of the 32 character lines on the display screen actually comprise 9 horizontal trace lines. Seven of these lines are used to generate the character, and an additional line is provided above and below the character for spacing. The timing circuit 140 is adapted to provide a signal on line 121 to AND gates 123 and 124 only during the trace line number 8 in each character line. The outputs from AND gates 123 and 124 are connected to the cursor input of the left and right screen character generators, 132 and 134 respectively, shown in FIG. 5. Accordingly, it can be seen that an output signal is provided from either AND gate 123 or AND gate 124 only when the trace from one of the CRTs passes the current cursor location.

The operating mode of the scan/read-write address selectors 66 and 82 and the read/write RAM address selector 110 are all controlled by the read/write select signal provided on line 95 from the read/write logic control circuit 50. The read/write select signal on line 95 is adapted to switch the above mentioned address selectors to the read mode of operation during the horizontal trace time of the CRTs, and to write mode of operation during the horizontal retrace time of the CRTs, when there exists a pending requirement. One character may be read from or written into memory on each trace and retrace, respectively. This provides the present data display terminal 10 with a transfer capability of more than 15,000 characters per second, or 150,000 Baud.

Referring specifically to FIG. 4, the present data display terminal 10 includes a novel heading protect circuit for protecting a designated number of lines at the top of the display screen. This feature can be of significant benefit to a terminal operator when viewing a computer print-out comprising numerous columns of data that extend more than 32 lines down the page. In such a situation, column headings, report titles, etc. would otherwise get scrolled off the top of the display screen as the remaining portions of the computer print-out are displayed. Consequently, the terminal operator can readily become confused with the significance of the numerous columns of data. To remedy this inconvenience, the present invention provides a heading line protect counter 98 which is originally set by the terminal operator to a number between one and nine to designate the number of lines desired to be protected. In actuality, the user depresses a key on the console of the display terminal which increments the counter 98 either up or down to the appropriate setting. The output from the heading line protect counter 98 is provided to the B input of a line count comparator 100. The A input to the comparator 100 is connected to the output of the actual scan line counter 90. The A<B output terminal from the line count comparator 100 is provided through an inverter 102 to one of the inputs of an OR-gate 104. The output from OR-gate 104 is connected to the select terminal of the scan line and page selector 106. The scan line input terminals from one input to selector 106 are also connected to the output of the actual scan line counter 90. The other input to the scan line and page selector 106 is connected to the output of the offset scan line counter 112.

As will be recalled, the output from the offset scan line counter 112 determines the memory line address accessed during the read mode of operation. The counter 112 is adapted to count 32 times from a selected offset line address determined by the setting of scroll counter 120. Thus, for example, if lines 10 through 41 of the second computer page stored in each RAM memory 126 and 128 are to be displayed, the first 6 output lines (Q0 through Q5) of the offset scan line counter 112 would be preset by scroll counter 120 to a binary 10 and the two page lines (Q6 and Q7) would be set to a binary 1 (the second in series 0,1,2,3). The offset scan line counter 112 would then access the following 32 lines of RAM memories 126 and 128.

However, for the heading, which is written into the first lines of a computer page of RAM memories 126 and 128, to appear at the top of the display screen when the offset scan line counter is set to display, for example, the middle of the computer page, it can be seen that it is necessary to override the offset scan line counter 112 for the appropriate number of lines at the top of the display screen. This is accomplished by utilizing the output from the actual scan line counter 90 which is adapted to count from zero to 32 regardless of the particular group of 32 lines currently being displayed on the screen. Since both the actual and offset scan line counters 90 and 112 are incremented by the same clock signal on line 111, it can be seen that the value of the actual scan line counter 90 differs from the value of the scan line output bits (Q0–Q4) of the offset scan line counter 112 by the setting of the scroll counter 120.

As stated, the output from the actual scan line counter 90 is compared to the setting of the heading line protect counter 98 by magnitude comparator 100. As long as the output from the actual scan line counter 90 is less than the setting of the heading protect counter 98, the line count comparator 100 provides an output signal on line 101 that is effective to switch the scan line and page selector 106 to pass the output from the actual scan line counter 90. When the output from the actual scan line counter 90 becomes greater than or equal to the setting of the heading line protect counter 98, the signal provided to the select terminal of the scan line and page selector 106 goes HI, switching the selector 106 to pass the output from the offset scan line counter 112.

Accordingly, it can be seen that if a heading is desired to be protected, the output from the actual scan line counter 90 will automatically override the output from the offset scan line counter 112 for the necessary number of character lines at the top of the display screen to protect the heading identified. Once the complete heading has been displayed, the scan line address accessing RAM memories 126 and 128 will automatically jump to the line address designated by the offset scan line counter 112. Thus, for example, the output from the scan line and page selector 106, which determines the memory line address accessed during the read mode of operation, may count from zero to 5, and then jump to 20 and count to 45.

To insure that the heading from the proper computer page of RAM memories 126 and 128 is selected, the output lines Q6 and Q7 from the offset scan line counter 112 that designate the particular computer page accessed are provided to a latch 108 which has its latch terminal connected to the output of OR-gate 104. The output from latch 108 is provided to the computer page address input terminals on the heading protect input side of selector 106. Thus, when an output signal is provided on line 101 from the line count comparator 100, the page designation from the offset scan line counter 112 is automatically latched and provided to the scan line and page selector 106 so that the heading corresponding to the designated computer page is accessed. In addition, the input terminal from the heading protect side of selector 106 that determines the half page of the designated memory page is permanently tied to ground. This automatically sets the accessed line address for the heading to the top half of the designated computer page. Also, to be noted is the connection of the Q4 output line from the actual scan line counter 90 to the other input of OR-gate 104. This provides an additional precaution to insure that the scan line and page selector 106 is never switched to the heading protect mode when the output of the actual scan line counter 90 is greater than or equal to 16.

As stated previously, each of the RAM memories 126 and 128 has the capacity to store eight display screens of data, which together comprise four computer pages. In the preferred embodiment, one of the RAM memories, herein RAM 128, has the capacity to store an additional display screen of data. This storage area in RAM memory 128 is separated from the "working text" area of the RAM memory so that during the normal operation of the display terminal, it is not accessible to the terminal operator for the entry of data therein. Instead, this portion of RAM memory 128 is set aside for the storage of computer communications, such as questions, corrections, or error messages, which are typically provided to assist the terminal operator. With conventional data terminal systems, if the terminal operator requests such information, or commits an error prompting an error message from the computer, the information from the computer is normally displayed over the text currently being built. Thus, the terminal operator is faced with the necessity of having to substantially duplicate the work accomplished up to that point.

To avoid this inconvenience the additional storage area in RAM memory 128 is utilized to store interactive batch communications of this type so that the data stored in the working text section of the RAM memory 128 will not be destroyed. For example, if the terminal user commits an error in the entry of data prompting an error message from the batch computer, the message is automatically written into the assigned section of RAM memory 128 and an error light is flashed on the front panel of the keyboard to notify the operator that an error has been committed and an error message received. To display the error message the terminal operator merely depresses the message page key on the keyboard and the message page section of RAM memory 128 is automatically accessed. The message is then read from RAM memory 128 and displayed on the screen. When the user has completed viewing the error message, the information that was previously displayed on the display screen can be recovered by deactivating the error message key and accessing the appropriate address locations of RAM memories 126 and 128. Corrective editing can then promptly be performed.

The present data display terminal accomplishes this novel result by providing a separate message page line counter 118 which is normally set to zero and is adapted to be incremented by a clock signal received from the read/write logic control circuit 50. The output from the message page line counter 118, which is adapted to count up to 31, is provided to the message line address selector 114, whose output is provided to the write input terminals of the read/write RAM address selector 110. The half page and page input lines to the message line address selector 114 are tied to ground so that the appropriate section of RAM memory 128 is automatically accessed when selector 114 is switched to the "message page" mode.

When receipt of a message from the batch computer is recognized by the terminal, the logic control circuit 50 automatically provides an enabling signal on the message write select line 115 which switches the message line address selector 114 to pass the output from the message page line counter 118. Additionally, the message write select signal on line 115 is provided to an AND gate 122 which has its other input connected to line 95 to receive the write select signal from the logic control circuit 50. The output of AND gate 122 is connected to the message strobe terminal of RAM memory 128. Accordingly, when a message is received the appropriate area of RAM memory 128 is automatically accessed for entry of the message information. Thus, it can be seen that the message information is automatically written into an unoccupied area of RAM memory 128. Accordingly, the currently displayed working text can be removed from the screen and the message displayed without loss of the text removed. Specifically, since the message information is not written over the text stored in RAM memory 128, the text can always be retrieved once the error message is removed by accessing the appropriate memory address locations.

In addition, it is to be understood that although the preferred embodiment herein discloses the use of a message page comprising only one display screen, the present data display terminal can be readily adapted so that a double screen message can be accommodated. The single screen version has been disclosed because it has been found that it is adequate to display all messages typically encountered.

As previously noted, the preferred embodiment of the present invention utilizes random access memories 126 and 128 as the screen image memory for the display terminal 10, rather than shift registers which are conventionally employed. Although RAMs 126 and 128 offer greater memory capacity than shift registers without sacrificing accessibility, the speed of random access memory units is limited. In conventional data display terminals, the ability of a shift register to be rapidly circulated is utilized to facilitate the rapid transmission of data from the display terminal to a remote terminal or batch computer. However, since RAMs 126 and 128 are already being circulated at their maximum rate, it is impossible for the present display terminal 10 to accomplish the same result in the same manner. Accordingly, to compensate for this disadvantage in the use of random access memories, the present invention provides a last character memory RAM 52, illustrated in FIG. 2, which is adapted to facilitate the transmission of data from the display terminal 10 to a remote processor by eliminating the needless transmission of the blanks that follow the last significant character in most of the data lines.

Returning to FIG. 2, the last character memory RAM 52 is connected to the outputs from the same cursor character counter 70 and cursor line calculator 116 as the screen image memory RAMs 126 and 128. As the data is originally entered into RAM memories 126 and 128, the last character memory RAM 52 memorizes the address location of the last significant character in each line. In particular, RAM 52 is adapted to remember the count of the cursor character counter 70 before it is reset to zero by a line feed signal. More specifically, RAM 52 comprises 256 eight-bit memory locations. The memory location of RAM 52 accessed is determined by the line address from the output of the cursor line calculator 116. Thus, as data from a given line is being entered into RAM memories 126 and 128, each succeeding count of the cursor character counter 70 writes over the number of the preceding character position in the currently accessed memory location of RAM 52. Accordingly, after the last character 18 is entered and the output from the cursor line calculator 116 is incremented, the number of the last character position from that line is retained in RAM 52. Thus, once the block of data has been completely entered into RAM memories 126 and 128, last character memory RAM 52 will contain the character positions of the last significant character in each line of the data.

The output from the last character memory RAM 52 is provided to the A input terminal of a magnitude comparator 54. The B input to comparator 54 is connected to receive the output from the cursor character counter 70. The A<B output terminal of comparator 54 is connected to the read/write logic control circuit 50. Thus, as information is being transferred from the data display terminal 10 to a remote processor, magnitude comparator 54 continuously compares the output from the cursor character counter 70 to the last character position memorized by RAM 52. As long as the output from RAM 52 is greater than or equal to the output from the cursor character counter 70 the transmission of characters from the accessed memory line continues. However, when the output from the cursor character counter 70 exceeds the value of the last character position remembered by RAM 52, comparator 54 provides a "last character overrun" signal to logic control circuit 50 which is effective to cause logic control circuit 50 to generate a line feed signal automatically resetting the cursor character counter 70 and incrementing the cursor line counter 96. Thus, it can be seen that the last character memory RAM 52 avoids the needless transmission of blanks which comprise the balance of any line not containing a full 132 characters. Accordingly, the total time required to transmit a block of data from the display terminal 10 is significantly reduced.

In addition, it will be noted that the last character memory RAM 52 can also be utilized in the transmission of information stored in the message page section of RAM memory 128. Specifically, by tying the message write select line 115 to the line address input of RAM 52, the last character memory RAM 52 can automatically be enabled to remember the last significant character in each line of an error message as it is written into the "message page" section of RAM memory 128. However, the memory capacity of the last character memory RAM 52 would have to be increased to 288 to accommodate the 32 additional lines of the message page.

Information is read from the screen image memory RAMs 126 and 128 and transmitted from the display terminal 10 via the UART/USART control circuit 40. In particular, the outputs from RAM memories 126 and 128 are connected to a data-out selector 130 (FIG. 5) which has its output therefrom connected to the input of the keyboard/screen selector 36. The select terminal of data-out selector 130 is connected to the output of logic circuit 68 (FIG. 3) so that for values of the cursor character counter 70 greater than or equal to 80, the signal applied to the select terminal of selector 130 is HI. Accordingly, the data-out selector 130 is adapted to pass the information from the left RAM memory 126 for the first 80 character positions in each line, and automatically switch to pass the data from the right RAM memory 128 for the remaining characters in each line. Contemporaneously, the read/write logic control circuit 50 provides a select screen read enabling signal to the keyboard/screen selector 36 which switches the selector to pass the information from the RAM memories 126 and 128 to the UART control block 40. The parallel data is then converted to a serial output signal which is provided on input/output line 22.

Returning to FIG. 5, data is stored in RAM memories 126 and 128 in coded form. Accordingly, the outputs from RAM memories 126 and 128 are provided to a pair of character generators, 132 and 134 respectively, which convert the coded information stored in RAM memories 126 and 128 to presentable character form. The parallel outputs from character generators 132 and 134 are then provided to a pair of shift registers, 136 and 138 respectively, which convert the parallel input signals to serial output signals which are provided to the video monitors 12 and 14.

Looking now to FIG. 6, the circuit diagram of the timing and synchronization circuit 140 of the present invention is shown. Timing circuit 140 essentially provides all the organizational timing for the display terminal 10. The timing diagram in FIG. 7 illustrates the conditions of various timing signals from selected points in the timing circuit 140. The various locations in timing circuit 140 from which the signals illustrated in FIG. 7 were taken are correspondingly labelled in FIG. 6 for reference purposes.

Finally, as it will be readily apparent to those skilled in the art, the embodiment of the present data display terminal 10 disclosed herein can be modified by replacing all of the standard counters, adders, gates, etc., involved in the lower speed portions of the terminal 10 with a microprocessor. In particular, except for the keyboard 30 and UART/USART 40, those portions of the circuit to the left of the dashed line 150 could be eliminated and replaced with a single microprocessor system (CPU, scratchpad, program memory, and I/O interfaces) programmed to perform the functions of the discrete components replaced. The microprocessor version is readily adaptable to various batch computer codes, poling/queing techniques, and multi-terminal intercommunication requirements. However, since the theory the operation of the microprocessor version of the present invention is identical to the discrete component version described herein, the softwave necessary to program the microprocessor is within the ordinary skill of those versed in the art.

While the above description constitutes the preferred embodiment of the invention, it will be appreciated that the invention is susceptible to modification, variation and change without departing from the proper scope or fair meaning of the accompanying claims.

Having thus described my invention, what is claimed is:

1. A data display terminal for displaying data received from a remote data processor or for entering data into a remote data processor including:
video display means including a pair of cathode ray tubes positioned side-by-side so that their associated screens form a substantially continuous display area;
memory means for sorting at least one computer page of data to be displayed on said screens;
input means for entering data into said memory means;
output means for reading data from said display memory means and providing said data to said video display means so that said data is displayed in sequence across said screens, including offset means for generating an offset and control means for controlling the positioning of said data within said display area in accordance with said offset so that the junction of said two screens separates said data at a convenient location.

2. The data display terminal of claim 1 wherein said pair of cathode ray tubes have the combined capacity to display less than the total number of lines of data in a computer page.

3. The data display terminal of claim 2 further including scrolling means for scrolling additional lines of data from said display memory means onto said screens and simultaneously scrolling an equivalent number of displayed lines of data off of said screens.

4. The data display terminal of claim 3 wherein said memory means is adapted to retain data scrolled off of said screens by said scrolling means so that the data removed from said screens can again be displayed on said screens by reversing the direction of said scrolling means.

5. The data display terminal of claim 4 further including heading protect means for preventing a selectable number of lines at the top of said screens from being scrolled off of said screens as additional data from said computer page of data stored in said display memory means is scrolled onto said screens.

6. The data display terminal of claim 5 wherein said scrolling means includes a scroll counter that is set by the terminal operator to the display memory line address of the line of data to be displayed at the top of said screens; said output means includes a first scan line counter connected to the output of said scroll counter that is adapted to count 32 counts from its preset value established by the setting of said scroll counter and whose output determines the display memory line address to be accessed; and said heading protect means is adapted to override said first scan line counter for the first selected number of counts of said first scan line counter.

7. The data display terminal of claim 6 wherein said heading protect means includes a second scan line counter that is adapted to count from 0 to 31 irrespective of the setting of said scroll counter, and selector means for substituting the output of said second scan line counter for that of said first scan line counter for the first selected number of counts of said scan line counters.

8. The data display terminal of claim 1 wherein each of said pair of cathode ray tubes has the capacity to display N characters per line, where 2N is greater than 132.

9. The data display terminal of claim 8 wherein said memory means comprises a separate memory unit for each of said pair of cathode ray tubes, and said input means is adapted to enter into one of said memory units the first N characters in each line of data, and enter into the other of said memory units the last N characters in each line of data, so that there is an overlap between the last (2N−132) characters from each line of data entered into said one memory unit and the first (2N−132) characters from each line of data entered into said other memory unit.

10. The data display terminal of claim 9 wherein said control means is adapted to shift said data either left or right within said display area up to a maximum of (2N−132) character positions.

11. The data display terminal of claim 10 wherein said control means includes a first scan counter whose output determines the character address of said one memory unit accessed, and a second scan counter whose output determines the character address of said other memory unit accessed, said first and second scan counters being adapted to count N counts from their preset values.

12. The data display terminal of claim 11 wherein said first scan counter is adapted to be preset in accordance with said offset to a value between zero and a negative (2N−132), and said second scan counter is adapted to be preset in accordance with said margin offset to a value equivalent to the preset value of said first scan counter plus (2N−132).

13. The data display terminal of claim 12 wherein said one memory unit is disabled whenever the output value of said first scan counter is less than zero, and said other memory unit is disabled whenever the output value of said second scan counter is greater than or equal to (2N−132).

14. The data display terminal of claim 1 further including means for transmitting data from said memory means to said remote data processor; and second memory means accessible only by said remote data processor for storing communication messages received from said remote data processor in response to data transmitted from said display terminal to said remote data processor.

15. The data display terminal of claim 14 further including means for automatically accessing said second memory means upon the receipt of a communication message from said remote data processor.

16. The data display terminal of claim 15 wherein said output means is further adapted to read information from said second memory means and provide said information to said video display means for displaying on at least one of said screens.

17. A data display terminal including:
a video display screen;
display memory means for storing lines of data to be displayed on said screen;
input means for entering data into said memory means;
output means for retrieving lines of data from said memory means for displaying on said screen including scrolling means for displaying additional lines of data from said display memory means on said screen and simultaneously removing an equivalent number of displayed lines of data from said screen including a scroll counter setable by the terminal operator, and a first scan line counter connected to the output of said scroll counter that is adapted to count a predetermined number of counts from its preset value established by the setting of said scroll counter and whose output determines the display memory line address to be accessed; and heading protect means for protecting a selectable number of lines at the top of said screen so that only the remaining lines of data displayed on said screen are affected by said scrolling means, including circuit means for causing said output means to display at the top of said screen the first selected number of lines of data stored in said memory means by overriding said first scan line counter for the first selected number of counts of said first scan line counter.

18. The data display terminal of claim 17 wherein said display memory means is adapted to retain data scrolled off of said display screen by said scrolling means to that the data removed from said screen can again be displayed on said screen by reversing the direction of said scrolling means.

19. The data display terminal of claim 18 wherein said heading protect means includes a second scan line counter that is adapted to count from 0 to 31 irrespective of the setting of said scroll counter, and selector means for substituting the output of said second scan line counter for that of said first scan line counter for the first selected number of counts of said scan line counters.

20. The data display terminal of claim 19 wherein said heading protect means further includes a heading line counter that is set by the terminal operator to the number of lines at the top of said screen desired to be protected, and a magnitude comparator having one input thereof connected to receive the output from said heading line counter and its other input thereof connected to receive the output from said second scan line counter, said magnitude comparator being adapted to provide an output signal whenever the value of the signal at said other input is less than the value of the signal at said one input.

21. The data display terminal of claim 20 wherein said output means further includes second selector means having one input thereof connected to receive the output from said first scan line counter, its other input thereof connected to receive the output from said second scan line counter and its output provided to said display memory means to determine the memory line address accessed, said second selector means being adapted to provide at its output thereof the signal received at said other input whenever said output signal is provided by said magnitude comparator and provide at its output thereof the signal received at said one input whenever said output signal is not provided by said magnitude comparator.

22. A data display terminal including:
random access display memory means for storing data;
input means for entering data into said random access display memory means;
video display means including a video screen for displaying the data stored in said random access display means;
transmission means adapted to sequentially access said random access display memory means and transmit the data stored therein to an external output; and
last character memory means adapted to store the display memory character addresses of the last significant characters in each line of data stored in said random access display memory means, and provide an output signal that is effective to increment the line address accessing said random access display memory means during transmission of said data once said transmission means has transmitted the last significant character in a line of said data.

23. The data display terminal of claim 22 wherein said last character memory means is adapted to remember the display memory character addresses of the last significant characters in each line of data as said characters are entered into said random access display memory means by said input means.

24. The data display terminal of claim 23 wherein said input means includes a character counter that is adapted to be incremented upon the entry of a character into said display memory means and reset by a line feed and whose output determines the display memory character address accessed for entry of the succeeding character, and a line counter that is adapted to be incremented by a line feed and whose output determines the display memory line address accessed for entry of the succeeding character.

25. The data display terminal of claim 24 wherein said random access memory means includes a random access memory unit that is adapted to store the output of said character counter at the memory address location determined by the output of said line counter so that each succeeding output value from said character counter writes over the previous output value stored in said memory unit until a line feed increments said line counter thereby accessing a new memory address location.

* * * * *